United States Patent
Gieras et al.

(10) Patent No.: US 10,666,097 B2
(45) Date of Patent: May 26, 2020

(54) SWITCHED RELUCTANCE ELECTRIC MACHINE INCLUDING POLE FLUX BARRIERS

(71) Applicant: Hamilton Sundstrand Corporation, Charlotte, NC (US)

(72) Inventors: Jacek F. Gieras, Glastonbury, CT (US); Gregory I. Rozman, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 88 days.

(21) Appl. No.: 15/838,471

(22) Filed: Dec. 12, 2017

(65) Prior Publication Data
US 2019/0181702 A1 Jun. 13, 2019

(51) Int. Cl.
*H02K 1/14* (2006.01)
*H02K 1/24* (2006.01)
*H02K 19/10* (2006.01)

(52) U.S. Cl.
CPC .............. *H02K 1/246* (2013.01); *H02K 1/14* (2013.01); *H02K 19/103* (2013.01); *H02K 2201/12* (2013.01)

(58) Field of Classification Search
CPC ........ H02K 1/246; H02K 19/103; H02K 1/14; H02K 2201/12
USPC ............................ 310/168, 216.055, 216.075
See application file for complete search history.

(56) References Cited

U.S. PATENT DOCUMENTS

| | | | | |
|---|---|---|---|---|
| 2,913,607 A | * | 11/1959 | Douglas | H02K 19/14 310/216.107 |
| 3,210,584 A | * | 10/1965 | Jorgensen | H02K 19/14 310/265 |
| 3,686,553 A | * | 8/1972 | Broadway | H02K 1/246 318/737 |
| 6,097,126 A | * | 8/2000 | Takura | H02K 21/16 310/166 |

(Continued)

FOREIGN PATENT DOCUMENTS

| | | |
|---|---|---|
| DE | 102013100501 | 7/2014 |
| EP | 3136549 | 3/2017 |

(Continued)

OTHER PUBLICATIONS

The Extended European Search Report for EP Application No. 18211602.0, dated Oct. 2, 2019.

*Primary Examiner* — John K Kim
(74) *Attorney, Agent, or Firm* — Carlson, Gaskey & Olds, P.C.

(57) ABSTRACT

A switched reluctance electric machine includes a stator ring having a plurality of stator poles, at least one rotor concentric to the stator ring and including a yoke portion and a plurality of pole portions extending radially from the yoke portion. A plurality of pole flux barriers are embedded in each of the at least one rotor such that a first portion of each of the plurality of pole flux barriers extends radially into a first pole portion in the plurality of pole portions, a second portion of the pole flux barrier extends radially into a second pole portion in the plurality of pole portions, and a third portion of the pole flux barrier passes through the yoke portion and connects the first portion and the second portion of the pole flux barrier.

15 Claims, 3 Drawing Sheets

(56) References Cited

U.S. PATENT DOCUMENTS

| | | | |
|---|---|---|---|
| 6,225,724 B1* | 5/2001 | Toide | H02K 1/276 310/156.53 |
| 8,022,586 B2 | 9/2011 | Holtzapple et al. | |
| 8,847,522 B2 | 9/2014 | Nashiki et al. | |
| 9,246,363 B2* | 1/2016 | Dickinson | H02K 1/24 |
| 9,312,733 B2 | 4/2016 | Ramu | |
| 9,577,479 B2* | 2/2017 | Pollock | H02P 6/26 |
| 2008/0247515 A1* | 10/2008 | Probst | G01N 23/20025 378/160 |
| 2011/0048821 A1* | 3/2011 | Dial | B60L 58/21 180/65.1 |
| 2011/0285242 A1* | 11/2011 | Dickinson | H02K 1/246 310/216.055 |
| 2012/0181888 A1* | 7/2012 | Shibukawa | H02K 1/276 310/156.01 |
| 2013/0313934 A1* | 11/2013 | Kawasaki | H02K 1/276 310/156.11 |
| 2015/0035390 A1* | 2/2015 | Randall | H02K 1/28 310/46 |
| 2017/0126158 A1 | 5/2017 | Gieras | |
| 2017/0288514 A1* | 10/2017 | Tong | H02K 1/246 |
| 2019/0181702 A1* | 6/2019 | Gieras | H02K 1/246 |

FOREIGN PATENT DOCUMENTS

| | | |
|---|---|---|
| GB | 1448990 | 9/1976 |
| JP | 2001258220 | 9/2001 |
| JP | 2001359262 | 12/2001 |

* cited by examiner

SWITCHED RELUCTANCE ELECTRIC MACHINE INCLUDING POLE FLUX BARRIERS

TECHNICAL FIELD

The present disclosure relates generally to switched reluctance electric machines, and more specifically to a switched reluctance electric machine including pole flux barriers in the rotors.

BACKGROUND

Switched reluctance electric machines are utilized in many applications to convert electrical power into mechanical rotation, or to convert mechanical rotation into electrical power, due, at least in part, to their relatively cheap and durable construction. Switched reluctance machines are doubly-salient, singly excited electric machines and include a stator positioned around a rotor. Doubly salient machines are electrical machines that include both salient stator poles and salient rotors. The interaction between the magnetic fields of the rotors and the stators causes the imposition of an electrical current through the stator to generate rotation in the rotors and/or the mechanical rotation of the rotors to generate an electrical current through the stator according to known principles.

Existing switched reluctance machines generate an undesirably high cogging torque, induce high physical vibrations, and generate substantial amounts of acoustic noise due to the interaction of the salient stator poles and salient rotor poles.

SUMMARY OF THE INVENTION

In one exemplary embodiment a switched reluctance electric machine includes a stator ring including a plurality of stator poles, at least one rotor concentric to the stator ring and including a yoke portion and a plurality of pole portions extending radially from the yoke portion, and a plurality of pole flux barriers embedded in each of the at least one rotor such that a first portion of each of the plurality of pole flux barriers extends radially into a first pole portion in the plurality of pole portions, a second portion of the pole flux barrier extends radially into a second pole portion in the plurality of pole portions, and a third portion of the pole flux barrier passes through the yoke portion and connects the first portion and the second portion of the pole flux barrier.

In another exemplary embodiment, a rotor for a switched reluctance electric machine includes a ring shaped yoke, a plurality of rotor poles extending radially from the ring shaped yoke, and a plurality of flux barriers embedded within the rotor, each of the flux barriers including two rotor pole portions and a rotor yoke portion connecting the two rotor pole portions, wherein the rotor pole portions extend into circumferentially adjacent rotor poles.

An exemplary method for creating a reduced torque cogging rotor includes manufacturing rotor body having a ring shaped yoke and a plurality of rotor poles extending radially from the ring shaped yoke, and embedding a plurality of flux barriers within the rotor, each of the flux barriers including two rotor pole portions and a rotor yoke portion connecting the two rotor pole portions, wherein the rotor pole portions extend into circumferentially adjacent rotor poles.

These and other features of the present invention can be best understood from the following specification and drawings, the following of which is a brief description.

DETAILED DESCRIPTION OF AN EMBODIMENT

Figure 1:
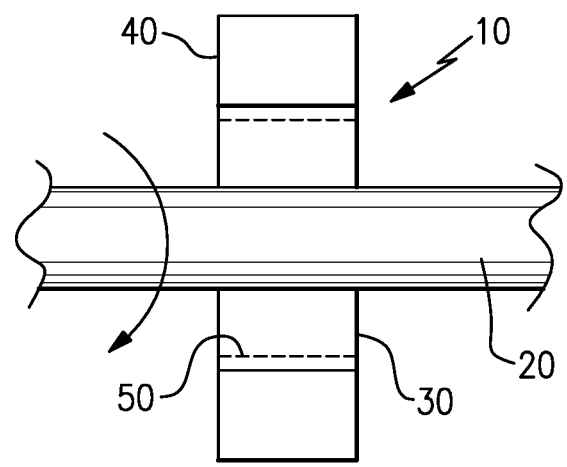
FIG. 1 illustrates an exemplary switched reluctance machine disposed about a shaft.

FIG. 1 schematically illustrates an exemplary switched reluctance machine 10 mounted to a shaft 20. The switched reluctance machine 10 includes a rotor portion 30 connected to the shaft 20. Disposed radially outward of the rotor portion 30 is a stator portion 40. The stator portion 40 is static relative to a housing and is maintained in the static position via any known means. The rotating shaft 20 and rotor portion 30 rotate within the stator portion 40. Embedded within the rotor portion 30 are multiple pole flux barriers 50. In the example of FIG. 1, the pole flux barriers 50 extend a full axial length of the rotor portion 30.

Figure 2:
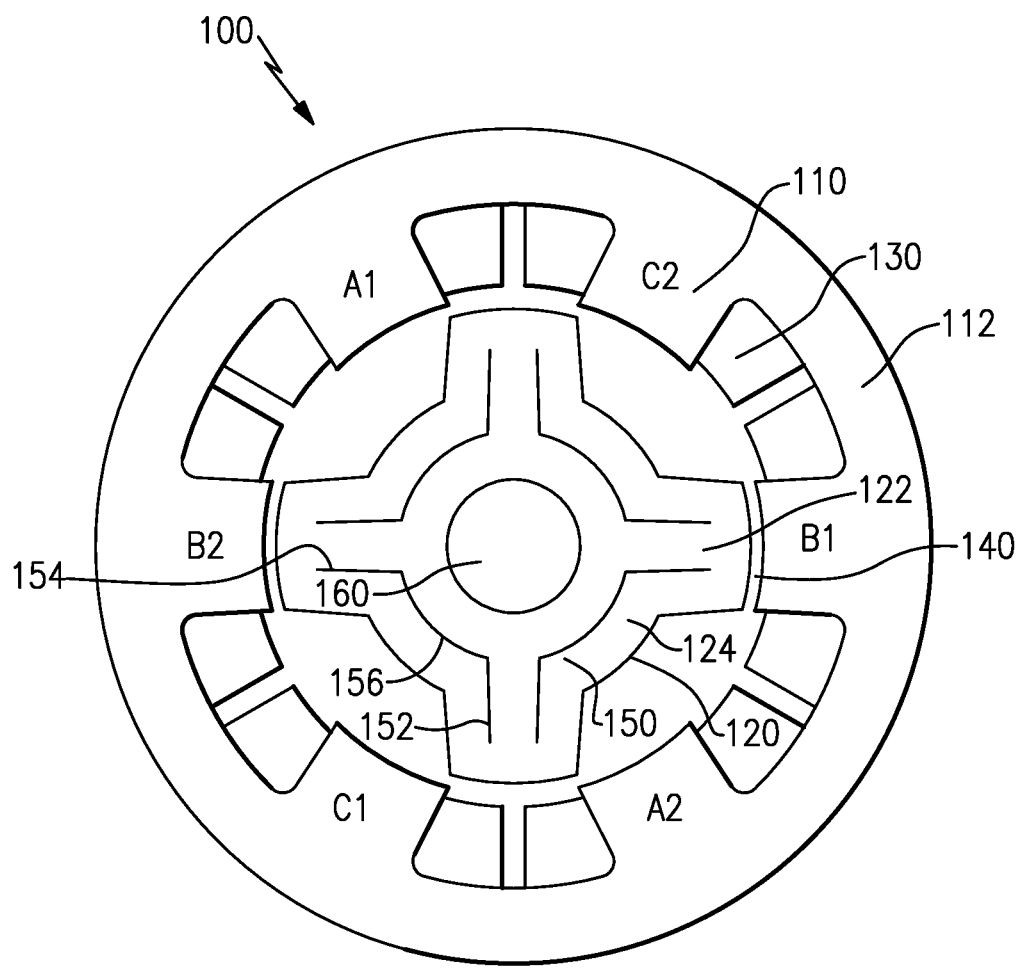
FIG. 2 schematically illustrates an end view of an exemplary six pole switched reluctance machine.

With continued reference to FIG. 1, FIG. 2 schematically illustrates a cross sectional view of an exemplary switched reluctance electric machine 100. The exemplary switched reluctance electric machine 100 includes six ferromagnetic stator poles 110 protruding radially inward from a stator ring 112. The stator ring 112 is ferromagnetic, and can alternately be referred to as a stator yoke. In some examples a housing (omitted for illustrative effect) can be positioned about the stator ring 112, and the stator ring 112 is maintained in a static position relative to the housing. Disposed radially inward of the stator ring 112, and the stator poles 110, is a ferromagnetic rotor 120 having four ferromagnetic rotor poles 122 protruding radially outward therefrom. The rotor ring 124 from which the rotor poles 122 extend can alternatively be referred to as a rotor yoke.

The exemplary switched reluctance electric machine 100 is a three phase machine, and the number of stator poles 110 and the number of rotor poles 122 utilized is designed to meet the following condition: $n_a = GCD(N_s, N_r)$, where $n_a$ is the number of positions where a pair of the rotor poles 122 are aligned with a pair of the stator poles 110, $N_s$ is the number of stator poles 110, $N_r$ is the number of rotor poles 122, and GCD is the greatest common divisor of $N_s$ and $N_r$. By way of example, the illustrated switched reluctance electric machine 100 has six stator poles, and four rotor poles, resulting in a total of two aligned positions. One of skill in the art of electric machines will appreciate that this is merely exemplary, and any other number of rotor poles, stator poles, and aligned positions meeting the described condition can be utilized to similar effect. A gap between the rotor poles 122 and the stator poles 110 in the aligned position is referred to as the air gap 140.

Also included in the switched reluctance electric machine 100 are stator coils 130, with each stator coil 130 corresponding to a given stator pole 110. In the illustrated examples, the stator coils 130 of paired stator poles 110 (e.g. A1 and A2, B1 and B2, C1 and C2) are series connected and positioned on opposite stator poles 110 in order to create phase windings for a three phase output.

Embedded within the rotor 120 are multiple pole flux barriers 156. Each pole flux barrier 150 includes first rotor portion 152 extending into a rotor pole 122 and a second rotor portion 154 extending into a circumferentially adjacent rotor pole 122. The first and second rotor pole portions 152, 154 are connected by an arc shaped yoke portion 156 of the pole flux barrier 150. The pole flux barrier 150 is constructed of a non-ferromagnetic material.

The rotor 120 includes a shaft mount 160 for mounting a shaft to the switched reluctance electric machine 100. The shaft mount 160 allows for rotational motion of a shaft to be translated to the rotor 120, and for rotational motion of the rotor 120 to be translated to a shaft, depending on whether the switched reluctance electric machine 100 is operating in a generator mode or in a motor mode.

One drawback associated with previously existing switched reluctance electric machines is the presence of a relatively high cogging torque, the generation of physical vibrations, and the generation of excessive acoustic noise during standard operations. The inclusion of the non-ferromagnetic pole flux barriers 150 reduces the cogging torque, physical vibrations and acoustic noise without deteriorating the performance of the switched reluctance electric machine 100, or substantially increasing the manufacturing cost.

Figure 3:
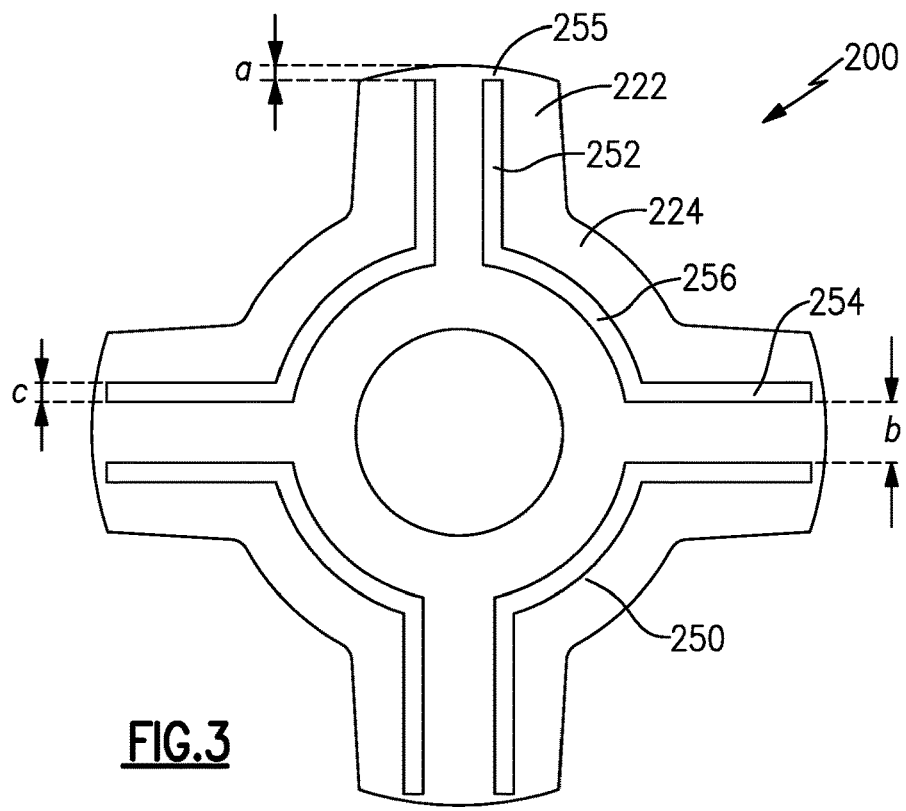
FIG. 3 schematically illustrates an exemplary rotor for a switched reluctance machine.

With continued reference to FIGS. 1 and 2, FIG. 3 schematically illustrates a rotor 200 isolated from the switched reluctance electric machine 100 (shown in FIG. 2). The rotor 200 includes ferromagnetic rotor poles 222 protruding radially outward from a ferromagnetic rotor yoke 224. Embedded within the rotor poles 222 and the rotor yoke 224 are multiple pole flux barriers 250, each including a first rotor flux barrier portion 252 and a second rotor flux barrier portion 254 connected via a yoke flux barrier portion 256.

The pole flux barriers 250 can be air voids in the ferromagnetic material of the rotor 200, or can be filled in with a non-ferromagnetic material such as aluminum, epoxy resin, plastic or copper. The presence of the flux barriers 250 concentrates the magnetic flux in certain portions of the rotor 220, causing select portions of the rotor poles 222 to be magnetically saturated. An illustration of the magnetic saturation is provided in FIG. 5, and described below. The magnetic saturation, in turn, reduces the inductance profile of the rotor pole 222 and consequently reduces the cogging torque, the physical vibrations, and the acoustic noise that is generated by the switched reluctance electric machine during operation. The additional magnetic saturation of the yoke 224 also impacts the inductance profile to further reduce the cogging torque.

In some examples, the rotor 200 can be constructed of a solid material including voids where the flux barriers 250 will be positioned. In such examples, the voids can be cast, milled, or a combination of both cast and milled. In alternative examples, the illustrated rotor 200 of FIG. 2 is a single layer of a laminated rotor. In such an example, multiple identical layers are stacked to create a three dimensional laminate rotor, according to standard laminate construction techniques. In either example, the flux barrier 250 extends a full axial length of the rotor 200, relative to an axis defined by the rotor 200. In yet further examples, the rotor can be additively manufactured, with a void defined where the flux barrier 250 will be positioned.

In one practical example, the flux barriers 250 have a width c of at most 3 mm, with the width c being the width of pole portion 252, 254 of the flux barrier 250 aligned with a tangent of the circumference of the rotor yoke at the pole portion 252, 254 of the flux barrier 250. Each of the rotor pole portions 252, 254 extends radially outward, but do not extend to the radially outermost edge of the rotor 222 including the pole portion 252, 254. The bridge of ferromagnetic material radially outward of the rotor pole portions 252, 254 is referred to as the pole bridge 255 and has a radial length a. In one practical example, the radial length a is at most 1.5 mm.

Further, as each rotor 222 includes two rotor pole portions 252, 254 embedded in the rotor 222, a flux barrier distance b is defined between the flux barrier rotor portions 254, 252. In practical examples, the flux barrier distance b can range from 4.0 mm to 10.0 mm, depending on the size of the switched reluctance electrical machine including the rotor 200.

Referring to the above defined dimensions, the cogging torque of the switched reluctance electric machine including the rotor 200 decreases as the thickness of the pole bridge a decreases, and the width of the flux barrier c increases. The cogging torque increases as the distance b between flux barriers 250 increases. This effect is generated due to variation in magnetic saturation of the rotor poles 222 and the rotor yoke 224 resulting from the flux barriers 250.

With continued reference to FIGS. 1-3, FIG. 4 schematically illustrates another exemplary rotor 300 isolated from a corresponding switched reluctance electric machine. The rotor 300 includes six rotor poles 322, as opposed to the four rotor poles 222 in the example of FIG. 3. A corresponding increase in the number of flux barriers 350 is included. As can be seen in both the rotor 200 of FIG. 3 and the rotor 300 of FIG. 4, the number of flux barriers 250, 350 in any given rotor 200, 300 is equal to the number of rotor poles 222, 322. While illustrated differently, the dimensional ranges of the pole bridge 355, the width c, the distance b, and the radial length a, are applicable to the six pole rotor 300 as well as to rotors including any other number of poles.

Figure 4:
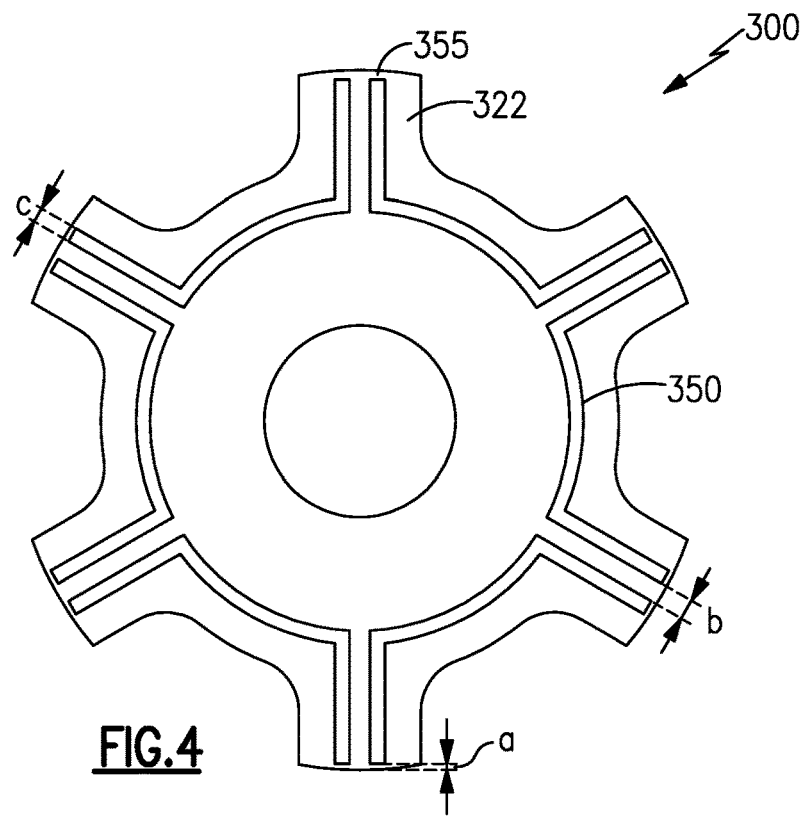
FIG. 4 schematically illustrates an alternate exemplary six pole rotor for a switched reluctance machine.
Figure 5:
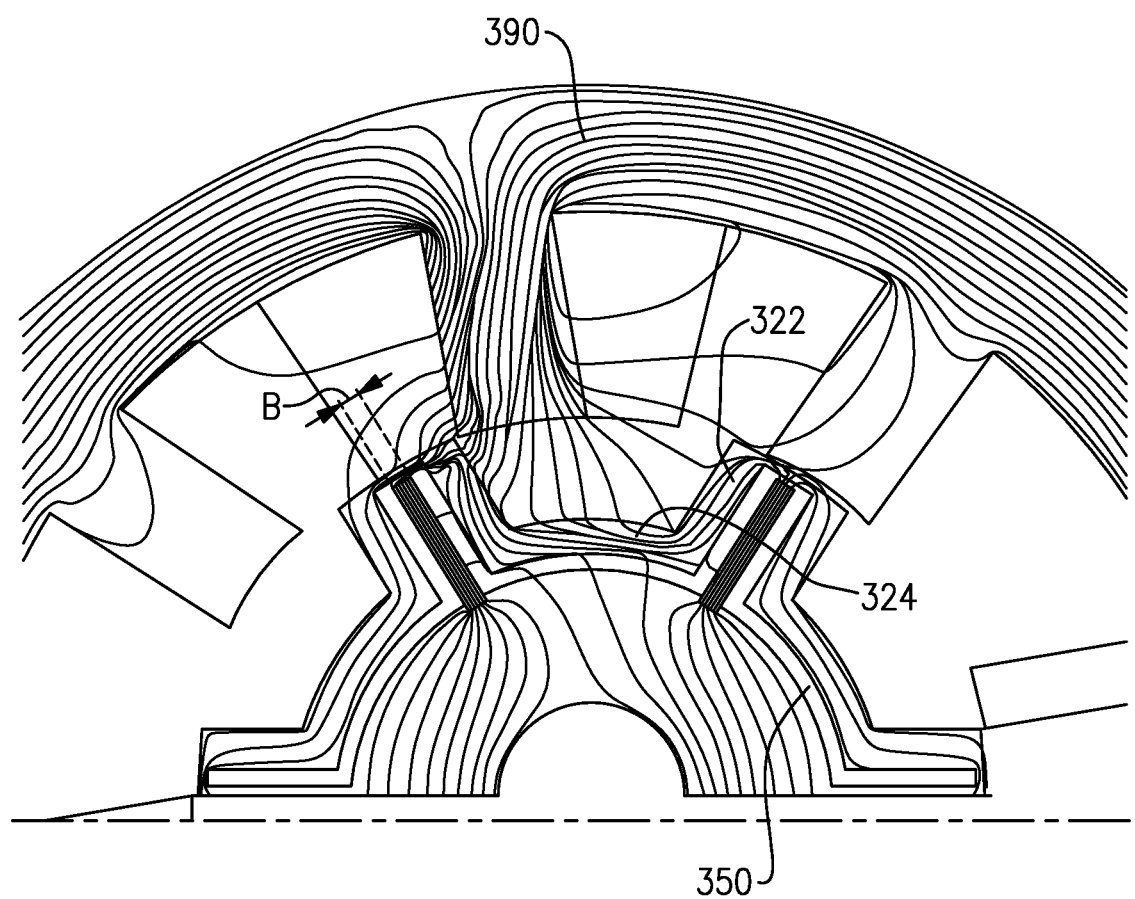
FIG. 5 schematically illustrates a magnetic flux distribution during operation of an exemplary switched reluctance machine.

With continued reference to FIG. 4, FIG. 5 schematically illustrates a partial view of the six pole rotor 300 disposed within a stator ring 390 during operation. Also illustrated is a magnetic flux distribution in the configuration including flux barriers 350. The magnetic flux distribution is illustrated via two dimensional electromagnetic field lines 390. As can be seen, the portion of the rotor yoke 324 between the flux barrier 350 and the radially outward edge of the rotor yoke 324 is heavily saturated by the flux distribution, as well as the portion of the rotors 322 between the rotor portions of the flux barriers in a given rotor pole.

While discussed above in the context of a single rotor, one of skill in the art will appreciate that the concepts extend to multi-rotor synchronous machines and/or synchronous machines having any number of phases and poles.

Even further still, while the exemplary embodiment describes a rotor disposed within a stator, an alternative example where the rotor is disposed radially outward of, and rotates about, the stator would be used to similar effect. In such an example, the rotor poles would protrude radially inward toward the stator, and the stator poles would protrude radially outward toward the rotor. In either example, the rotor is concentric to the stator.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A switched reluctance electric machine comprising:
a stator ring including a plurality of stator poles;
at least one rotor concentric to the stator ring and including a yoke portion and a plurality of pole portions extending radially from the yoke portion;
a plurality of pole flux barriers embedded in each of said at least one rotor such that a first portion of each of the plurality of pole flux barriers extends radially into a first pole portion in said plurality of pole portions, a second portion of the pole flux barrier extends radially into a second pole portion in said plurality of pole portions, and a third portion of the pole flux barrier passes through the yoke portion and connects the first portion and the second portion of the pole flux barrier, and wherein each pole flux barrier has a width of at most 3 mm;
wherein each pole portion includes the first portion of a first flux barrier in said plurality of flux barriers and a second portion of a second flux barrier in said plurality of flux barriers; and
wherein a distance between the first portion of the first flux barrier and the second portion of the second flux barrier is in the range of 4.0 to 10.0 mm.

2. A switched reluctance electric machine comprising:
a stator ring including a plurality of stator poles;
at least one rotor concentric to the stator ring and including a yoke portion and a plurality of pole portions extending radially from the yoke portion; and
a plurality of pole flux barriers embedded in each of said at least one rotor such that a first portion of each of the plurality of pole flux barriers extends radially into a first pole portion in said plurality of pole portions, a second portion of the pole flux barrier extends radially into a second pole portion in said plurality of pole portions, and a third portion of the pole flux barrier passes through the yoke portion and connects the first portion and the second portion of the pole flux barrier, and wherein each pole flux barrier has a width of at most 3 mm; and
wherein each pole portion extends at most 1.5 mm radially beyond a radially outermost end of the first portion of the pole flux barrier embedded in the pole portion.

3. The switched reluctance electric machine of claim 2, wherein the stator poles define a three phase output.

4. The switched reluctance electric machine of claim 2, wherein each pole portion includes the first portion of a first flux barrier in said plurality of flux barriers and a second portion of a second flux barrier in said plurality of flux barriers.

5. The switched reluctance electric machine of claim 2, wherein each of said pole flux barriers is a non-ferromagnetic material comprising at least one of an aluminum, an epoxy resin, a plastic, and a copper.

6. The switched reluctance electric machine of claim 2, wherein each rotor in said at least one rotor comprises a single ferromagnetic piece.

7. The switched reluctance electric machine of claim 2, wherein each rotor in said at least one rotor comprises a plurality of laminate layers.

8. The switched reluctance electric machine of claim 7, wherein each laminate layer includes a ferromagnetic rotor portion, and a plurality of non-ferromagnetic pole flux barrier portions.

9. The switched reluctance electric machine of claim 2, wherein each of said pole flux barriers in the plurality of pole flux barriers extends a full axial length of the rotor, relative to an axis defined by the rotor.

10. A rotor for a switched reluctance electric machine comprising:
a ring shaped yoke;
a plurality of rotor poles extending radially from said ring shaped yoke; and
a plurality of flux barriers embedded within said rotor, each of said flux barriers including a first rotor pole portions extending radially into a first rotor pole in the plurality of rotor poles, a second rotor pole portion extending radially into a second rotor pole in the plurality of rotor pole portion, and a rotor yoke portion passing through the ring shaped yoke and connecting the first rotor pole portion and the second rotor pole portion and having a width of at most 3 mm;
wherein each pole includes the first pole portion of a first flux barrier in said plurality of flux barriers and a second pole portion of a second flux barrier in said plurality of flux barriers; and
wherein a distance between the first portion of the first flux barrier and the second portion of the second flux barrier is in the range of 4.0 to 10.0 mm.

11. The rotor of claim 10, wherein the ring shaped yoke and the plurality of rotor poles are a single integral component, and wherein each of said flux barriers extends a full axial length of the rotor.

12. The rotor of claim 10, wherein the ring shaped yoke, the plurality of rotor poles, and the plurality of flux barriers are a laminate rotor construction, having multiple substantially identical layers.

13. The rotor of claim 10, wherein the ring shaped yoke and each of the plurality of rotor poles are ferromagnetic, and wherein each of the plurality of flux barriers are non-ferromagnetic.

14. The rotor of claim 10, wherein each rotor pole in said plurality of rotor poles includes a rotor pole portion of a first flux barrier and a rotor pole portion of a second flux barrier.

15. The rotor of claim 10, wherein each flux barrier in the plurality of flux barriers consists of one of an aluminum, an epoxy resin, plastic, copper and an air gap material.

* * * * *